United States Patent
Wadlow et al.

(10) Patent No.: US 6,230,271 B1
(45) Date of Patent: May 8, 2001

(54) DYNAMIC POLICY-BASED APPARATUS FOR WIDE-RANGE CONFIGURABLE NETWORK SERVICE AUTHENTICATION AND ACCESS CONTROL USING A FIXED-PATH HARDWARE CONFIGURATION

(75) Inventors: Thomas A. Wadlow, San Francisco; Joseph P. Kevin, Hayward, both of CA (US)

(73) Assignee: Pilot Network Services, Inc., Alameda, CA (US)

( * ) Notice: Subject to any disclaimer, the term of this patent is extended or adjusted under 35 U.S.C. 154(b) by 0 days.

(21) Appl. No.: 09/009,923

(22) Filed: Jan. 20, 1998

(51) Int. Cl.[7] .................................................. H04L 9/00
(52) U.S. Cl. ......................................... 713/201; 713/200
(58) Field of Search .................................... 713/200, 201, 713/202; 709/218, 227, 250; 714/38

(56) References Cited

U.S. PATENT DOCUMENTS

| | | | |
|---|---|---|---|
| 5,265,221 | * 11/1993 | Miller | 395/725 |
| 5,515,376 | * 5/1996 | Murthy et al. | 370/85.13 |
| 5,577,209 | * 11/1996 | Boyle et al. | 395/200.06 |
| 5,606,668 | * 2/1997 | Shwed | 713/201 |
| 5,610,905 | * 3/1997 | Murthy et al. | 370/401 |
| 5,623,601 | * 4/1997 | Vu | 395/187.01 |
| 5,781,550 | * 7/1998 | Templin et al. | 370/401 |
| 5,787,253 | * 7/1998 | McCreery et al. | 395/200.61 |
| 5,832,211 | * 11/1998 | Blakley, III et al. | 395/188.01 |
| 5,835,726 | * 11/1998 | Shwed et al. | 709/229 |
| 5,864,683 | * 1/1999 | Boebert et al. | 395/200.79 |
| 5,884,024 | * 3/1999 | Lim et al. | 395/187.01 |

* cited by examiner

Primary Examiner—Dieu-Minh T. Le
(74) Attorney, Agent, or Firm—Townsend and Townsend and Crew LLP; Philip H. Albert

(57) ABSTRACT

A secure interface between a private network and a public network are disclosed. The interface includes a collection of routing devices, telecommunications devices, packet-filtering devices, applications-filtering devices, monitoring and maintenance devices organized to enforce a wide variety of desired customer security policies. The apparatus allows a central service provider to install and maintain a collection of similar apparatus and support a number of customers with widely varying security policies and allows a rapid change in the security policy of a given customer, without affecting the security of other customers, and without requiring the customer to understand or modify the underlying apparatus.

7 Claims, 17 Drawing Sheets

DYNAMIC POLICY-BASED APPARATUS FOR WIDE-RANGE CONFIGURABLE NETWORK SERVICE AUTHENTICATION AND ACCESS CONTROL USING A FIXED-PATH HARDWARE CONFIGURATION

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

This invention relates to internetwork communications and data exchanges, and in particular to the security of information exchange between computer networks to inhibit and detect attempts at vandalism, espionage, sabotage or inadvertent destruction of data.

Computer networks connect multiple computer systems together, allowing them to share information. Initially, the computers were in one, secure location. As the utility of networks grew, it became more and more desirable to connect networks at different locations to allow information to flow between the computer systems at all sites. As the number of computer systems grew beyond the point where each user of the network was well known to all other users, the need for a mechanism to describe and enforce a policy for access, known as a "security policy", became apparent.

Two major techniques developed for security policy enforcement. The first is packet filtering, in which a security policy specifies what types of connections are allowed and permits or denies passage of TCP/IP packets of specific types through a router. The second technique is application filtering, which operates at a higher level, examining the specific transactions that pass through a TCP/IP connection, and allowing them or denying them based on the specific action being attempted, or the identity of the requester.

When combined, these two techniques comprise a firewall, whose purpose is to implement and enforce the security policy of an organization regarding connections between two or more networks. Historically, there have been two major types of firewalls: custom and commercial. A custom firewall is a device or collection of devices designed, purchased, assembled, configured and operated by an organization for the purposes of guarding a network interconnection. A commercial firewall collects many of the components of a custom firewall into a single device, and is sold (and sometimes configured) by a company to make the installation of a firewall easier and more cost effective.

Custom firewalls have many potential drawbacks. For one, because they are designed and constructed by a single organization that may not have extensive experience in the problems of firewall design, they may not account for many known problems. Because they are designed and built for a specific purpose, they are typically very difficult to adapt to new policies. This often requires a significant redesign effort, and additional hardware. Because they are built in a unique manner, each custom firewall requires special software, special training, and special expertise in modifications that does not translate into other firewall installations.

Commercial firewalls are designed to consolidate as many services as possible into a single box. That box is then used as the focus of a customer-specific firewall. Because some services, such as packet filtering, are often done better in routers, commercial firewalls are rarely used by themselves. Additional devices, and a design for their use, is often required, which returns the customer to many of the problems inherent in a custom firewall.

In addition, commercial firewalls are configured by the user, who may be unaware of many of the issues and problems of security policy design. It is estimated that more than 30% of all firewall penetrations happen through a commercial or custom firewall. This is typically because of poorly thought out configuration.

Because much of the functionality of a commercial firewall is concentrated in a single box, these devices also invite other problems. If the device fails, all communication between networks is cut off. There is no ability to gracefully degrade service. If the security of one service of the box is compromised, this can open a path for an attacker to compromise other services and widen their access. Also, the design of the single-box firewall very strongly affects the types of policies available to the customer. If a box is designed primarily as an applications gateway device, it is very difficult to configure it in a firewall that will permit some services to be performed via packet-filtering only.

One problem that is shared by both types of firewalls is that of scalability. Because each type of firewall has strong hardware/software/configuration customizations for each specific customer, managing the firewalls of more than one customer is very difficult. Making significant policy changes in multiple customer firewalls is also extremely difficult.

Because of these scalability problems, it has been quite difficult for a company to offer managed firewall services to many customers, since the scaling problems escalate with each new customer.

SUMMARY OF THE INVENTION

An improved security handler is provided by virtue of the present invention. In one embodiment of a security handler according to the present invention, a security handler includes means for obtaining customer security policies, a plurality of packet processing components with communications paths therebetween and configurable policy enforcement means, for enforcing a packet policy over the communications paths.

One advantage of the present invention is that a single configuration of physical components can be configured to provide a wide range of security policy choices while remaining capable of solving the foregoing problems of the prior art.

A further understanding of the nature and advantages of the inventions herein may be realized by reference to the remaining portions of the specification and the attached drawings.

DESCRIPTION OF THE PREFERRED EMBODIMENTS

Figure 1:
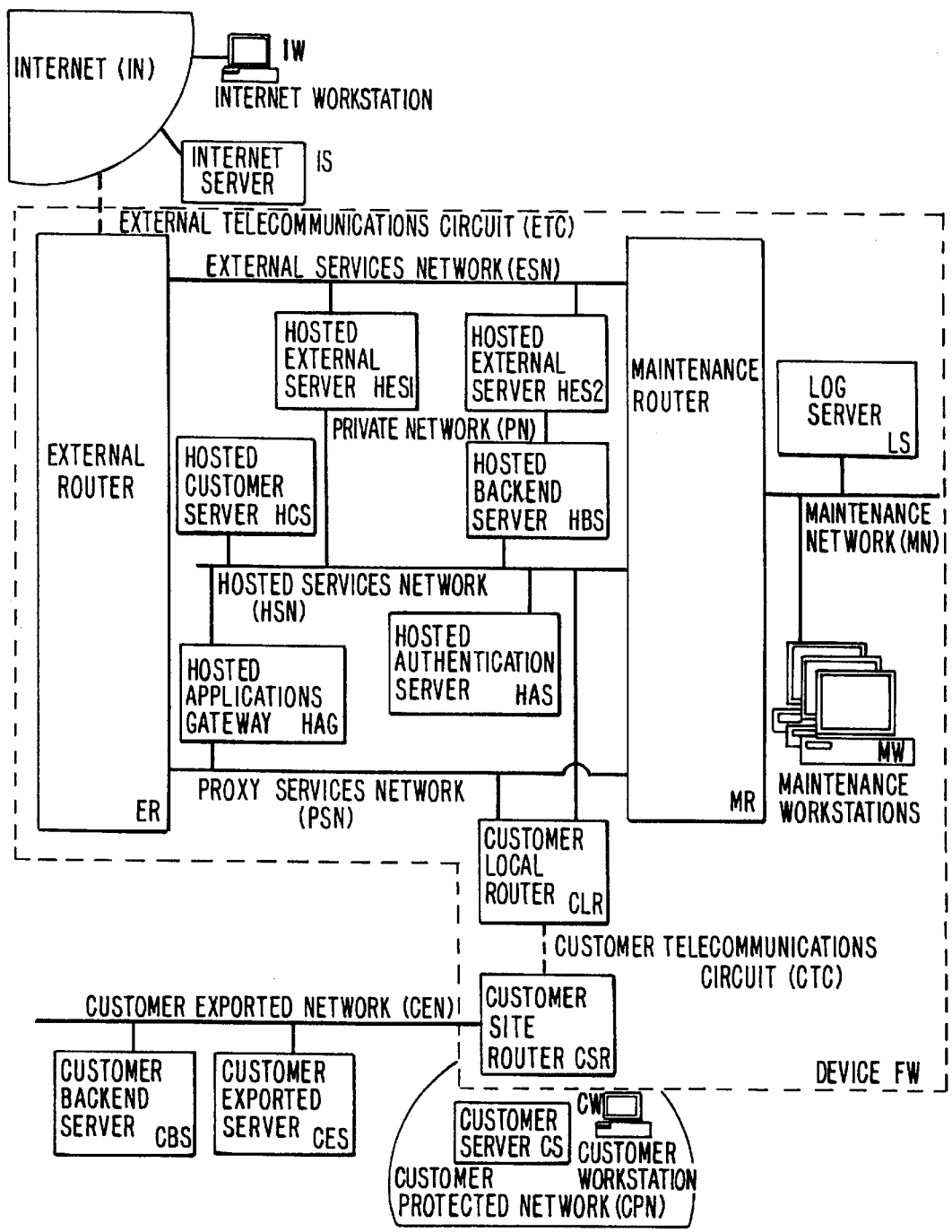
FIG. 1 is a block diagram of a security handler implementation abbreviated herein as "Device FW".

FIG. 1—System Overview

FIG. 1 shows the components of Device FW and the way in which each component is interconnected. Also shown, is an example external network (the Internet) and an example internal network (the Customer Network) to clarify the relationship between FW and an external and internal network.

In the preferred embodiment, Device FW is a collection of components, physically connected by networks and telecommunications circuits in an arrangement which permits a safe, but flexible range of usage strategies. Networks allow one component to communicate with another component in close physical proximity and the network can be form of multi-point connectivity, such as Ethernet, Fast Ethernet, FDDI, ATM or other networks that provide similar functionality. In the preferred embodiment described herein, network traffic is based on the TCP/IP network protocol.

FW communicates with components that are not in close physical proximity using telecommunications circuits. A telecommunications circuit can be any point-to-point link capable of carrying TCP/IP traffic, such as a T-1 line, a 56K line, a modem-based telephone connection, a microwave relay, a fiber-optic circuit.

TCP/IP packets are moved between networks or between telecommunications circuits and networks, or between different telecommunications circuits, by routers. Routers are also used for applying TCP/IP packet-filtering rules, which permit or deny passage to packets based on characteristics such as origination address, destination address, origination service port, destination service port, protocol, size, contents, time of day, encryption, etc. Preferably, each router supports a packet filtering model comparable to that of Cisco Systems IOS version 11.0 or later. Routers are available from various manufacturers such as. Cisco, Bay Network, or 3Com.

Servers are used to provide information to a network or collect information from a network. A server provides a service which is made available to workstations across a network. Servers can come from a variety of manufacturers, such as Sun Microsystems, Hewlett Packard, Silicon Graphics Digital Equipment Corporation. Servers run a variety of operating systems such as Solaris, SunOS, HP/UX, BSDI, Linux, FreeBSD. Preferably, whatever operating system is used, it should have the ability to eliminate extraneous software and services, control access to services and log access to services.

Servers can provide many types of service, such as World-Wide Web (WWW), File Transfer (FTP), RealAudio, RealVideo, authentication, database, logging. Gateways are used to apply a security policy to an application's network connection. Workstations are used to connect human beings to servers, and are also used to allow maintainers of Device FW to inspect and modify the security policy of Device FW.

Referring now to FIG. 1, the description of several individual components is now provided. An External Router (ER) controls traffic to and from the External network and enforces the outermost layer of the Security Policy. A Maintenance Router (MR) connects the portions of Device FW that implement the security policy with the Maintenance Network that host servers use to record the behavior of FW and workstations used to inspect or modify the behavior of FW.

The Customer Local Router (CLR) connects Device FW to the Customer Site Router (CSR). The CLR also limits the connections to and from a customer. The CSR connects a Customer Exported Network (CEN) and the Customer Protected Network (CPN). The CSR defines what types of traffic can pass between the CPN and Device FW, between the CEN and Device FW and between the CEN and the CPN.

A Log Server (LS) is used by FW to record the state and behavior of components. From this recorded information, statistics can be gathered about attacks, performance, connections established, and the success or failure of particular portions of the Security Policy. A Maintenance Workstation (MW) is used to inspect or change the behavior of Device FW.

A typical FW contains most or all of the following types of components:

Networks
Telecommunications circuits
Routers
Servers
Gateways
Workstations

The embodiment of FW shown in FIG. 1 is shown including the following components:

ER—External Router
MR—Maintenance Router
CLR—Customer Local Router
CSR—Customer Site Router
LS—Log Server
MW—Maintenance Workstation In addition, FIG. 1 shows the following representative components, of which there may be one or more actual components in an implementation (only one of each of these are shown for clarity and to illustrate the principles involved):

HCS—Hosted Customer Server
HES1—Hosted External Server, Type 1
HES2—Hosted External Server, Type 2
HBS—Hosted Backend Server
HAG—Hosted Applications Gateway
HAS—Hosted Authentication Server As shown in FIG. 1, FW also includes the following networks and telecommunications circuits:

ESN—External Services Network
HSN—Hosted Services Network
PSN—Proxy Services Network
ETC—External Telecommunications Circuit
CTC—Customer Telecommunications Circuit The External Network (EN) is shown including:

ETC—External Telecommunications Circuit
IN—Internet Network
IS—Internet Server
IW—Internet Workstation Also shown for purposes of clarification is a Customer Networks, which includes:

CS—Customer Server
CW—Customer Workstation
CPN—Customer Protected Network
CEN—Customer Exported Network
CES—Customer Exported Server
CBS—Customer Backend Server There may be any number of CBS and CES systems connected to the CEN. One of each is shown for purposes of clarification. ER is connected to ETC, ESN and PSN. MR is connected to ESN, HSN, PSN and MN. CLR is connected to CTC, PSN and HSN. CSR is connected to CTC, CPN and CEN. ESN is connected to ER, MR, HES1, and HES2. HSN is connected to MR, CLR, HCS, HES1, HBS, HAG and HAS. PSN is connected to ER, MR and HAG. MN is connected to MR, LS and MW. CEN is connected to CSR, CBS, and CES.

Figure 2:
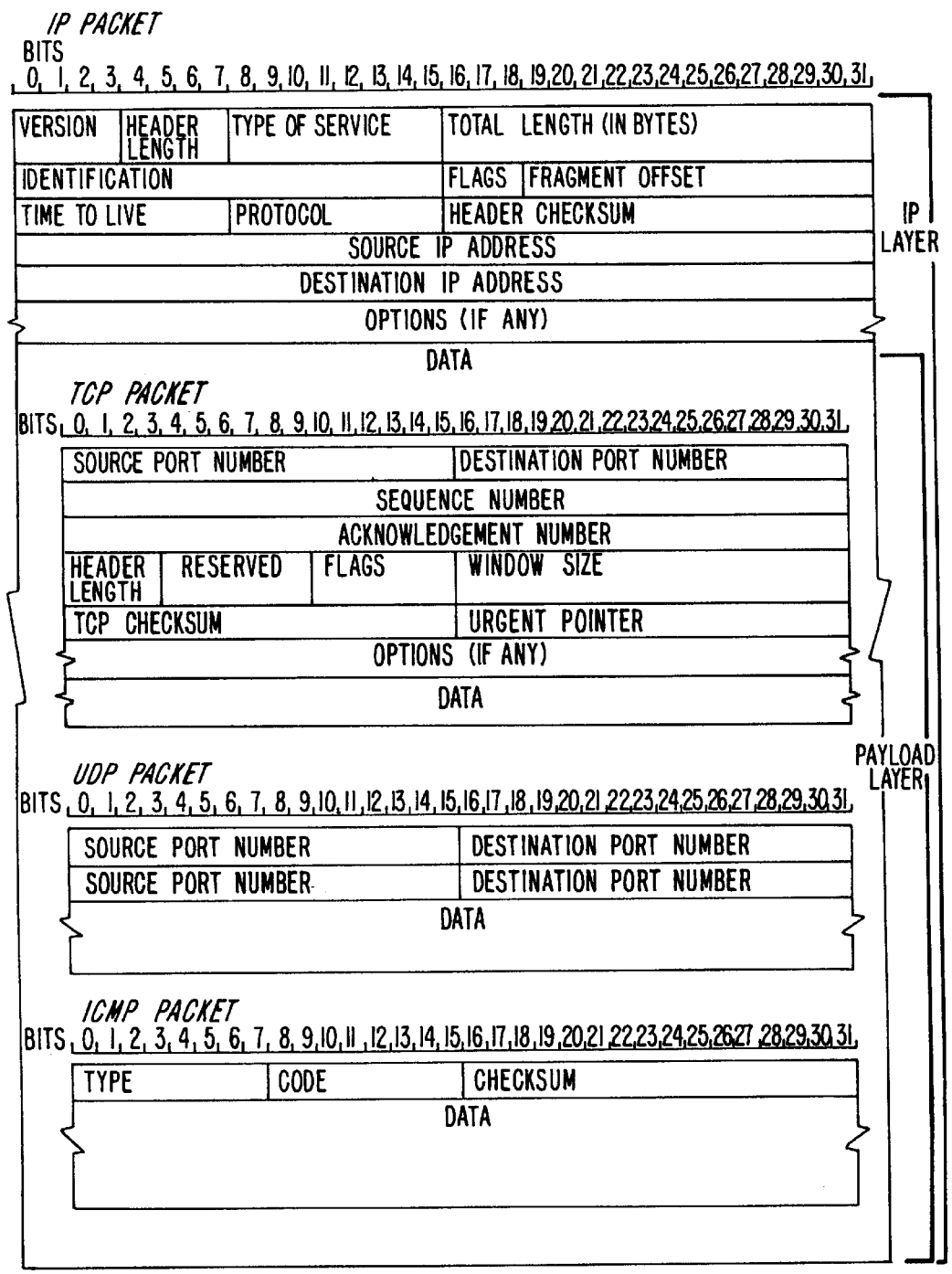
FIG. 2 is a schematic of a TCP/IP packet.

FIG. 2 shows a representation of a TCP/IP packet. A TCP/IP packet is a sequence of bits that is transmitted across a network or telecommunications circuit. Computers connected to the network can transmit or receive TCP/IP packets in order to implement a variety of services (such as remote terminal sessions, file transfer, and electronic mail). A service may require one or more packets to be transmitted and/or received.

A TCP/IP packet includes an "IP" layer and a "Payload" layer. The IP layer is used as an "envelope" to hold the Payload layer. The IP layer contains the address of the source machine (the "transmitter" of the packet), the address of the destination machine (the "receiver" of the packet) and other information pertaining to the delivery of the packet to its intended recipient. All of this information is kept in fields within the packet. The payload portion of the IP packet contains information pertaining to the specific application using the packet. This information is organized as either a TCP packet, a UDP packet or an ICMP packet.

A TCP packet is used to carry part of a connection that is "stream-like". This would be information that is in a sequence, such as the contents of a file or a virtual terminal session. TCP packets are in sequence, and are "reliable", which means that they are guaranteed to arrive in order if they arrive at all. If they do not arrive, their absence will be noticed. A UDP packet is intended for data that is nonsequential. UDP packets are often called "datagrams" to emphasize their similarity to telegrams, in which the entire context of the message is contained within the single packet or message. A UDP packet might be used for an occasional status update or to log a particular event. UDP packets are nonsequential, and arrive in no predefined order. They are "unreliable" in that a packet may not arrive and if it does not its absence will not be noticed. An ICMP packet is used for network signalling. In particular, ICMP messages are used to indicate a problem of some kind with the transmission of packets from their source to their destination. Additionally, ICMP packets can be used to verify that a particular destination is reachable without problems.

Each type of payload packet contains a data field that can be filled by the transmitting machine with data that is intended for a specific type of service. Thus, if the application in use was a virtual terminal session, and the user sent a character by typing on a keyboard, the virtual terminal program in use would create an IP packet intended for the destination machine, which contained a TCP packet intended for the virtual terminal host program on that machine, which contained a data field containing the character typed.

Figure 3:
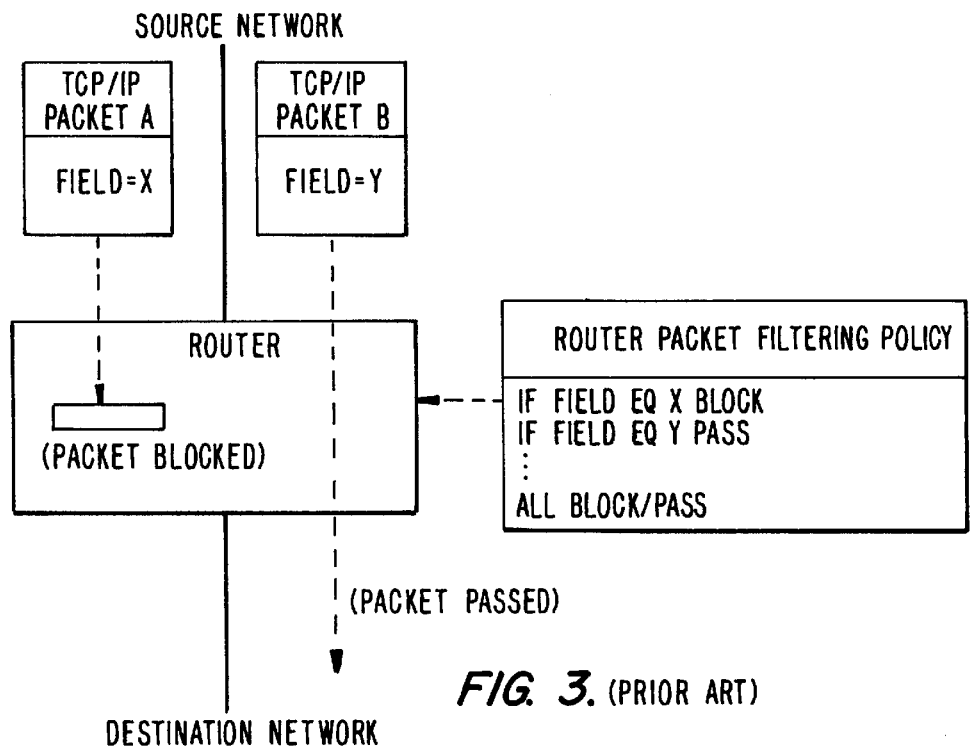
FIGS. 3, 3a show a representation of the process of packet filtering.

FIG. 3 shows a representation of the process of packet filtering. TCP/IP Packets (hereafter referred to as simply packets) are transmitted through a network by means of devices called routers. Routers are connected to telecommunications circuits or other networks by means of interfaces. A router receives a packet on a particular interface, and by examining that packet and an internal map showing the networks reachable by all of its interfaces (known as a routing table) selects an output interface for that packet and transmits it through that interface. This process is known as routing. In some cases, a router receives a packet which is intended for a destination that cannot be reached from that router. In this case, transmission fails, and the packet is erased and an error message, typically in the form of an ICMP packet (see FIG. 2) is returned to the source of the packet. This type of failure usually indicates a problem with the network. However, some types of routers implement a very similar mechanism for causing packets to fail to reach their destination because of security reasons, not network failure. This process is known as packet filtering, because it allows a network manager to filter out unwanted or unauthorized packets from reaching machines on that network.

Figure 3A:
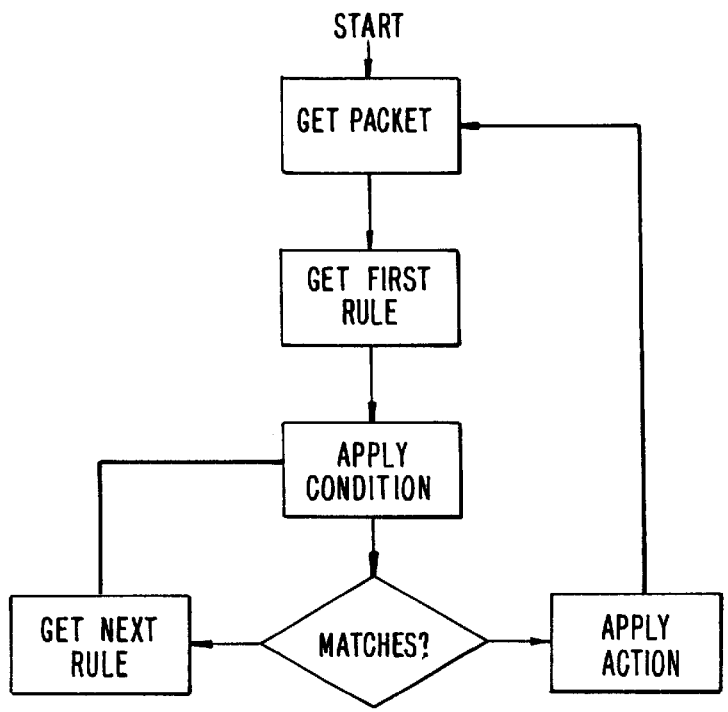

Packet filtering is based on the fields used within a packet (see FIG. 2). A list of rules is loaded into the router that describes the test that a router should apply to each packet to determine whether or not it should be passed or prevented from passing (blocked). This list of rules is known as a Router Packet-Filtering Policy. Generally, this policy is loaded when the router is first turned on, but in practice it may be updated occasionally by human intervention without turning the router off. The packet filtering policy is a list of conditions that describe how packets are to be tested for passage through the router. Each entry in the list consists of a condition and an action. If the packet meets the condition, the action is performed. Generally the actions are to pass or to block. For passing, the packet is sent through the router toward its eventual destination. For blocking, the packet is erased and no transmission toward the intended destination takes place. If the packet does not meet the condition, then the next rule in the list is tried, and this process continues until all the rules have been applied or until a condition is met (See FIG. 3a).

Packet-filtering routers typically have an implicit final rule which is either ALL PASS or ALL BLOCK, where the condition ALL is one that every packet meets. This final rule, whether implicit or explicit, determines the character of how all of the previous rules must be written. Because of this final condition, there is always a rule that is applicable to a given packet. The case where the final rule is ALL PASS is known as a permissive policy. With ALL PASS, the previous rules must be written so that all cases of packet blockage are specified in advance, and any packet that does not match one of these cases is allowed to pass. The case where the final rule is ALL BLOCK is known as a restrictive policy. With ALL BLOCK, the previous rules must be written so that all cases of a packet passage are specified in advance and any packet that does not match one of these cases is blocked. The conditions for packet matching are based on the fields within the IP, TCP, UDP, and ICMP packets.

FIG. 3 shows two cases of packets entering a router from a source network, intended for a destination network. A Router Packet Filtering Policy has been previously defined for that router. Packet A is the first test case. Packet A has an arbitrary field (designated by the term field) equal to value x. Packet B is the second test case. Packet B has field equal to value y. Packet A enters the router, and the first rule of the packet filtering policy is applied. Because field is equal to x, this condition matches. The action for this rule is "block", so this packet is not permitted to pass through the router. No further rules are applied. Packet B enters the router, and the first rule of the packet filtering policy is applied. Because field is not equal to x in packet B, this rule does not apply. The second rule is applied, and it matches. The action for this rule is "pass" and so this packet is passed on to the destination network. No further rules are applied. Packet filtering rules can be written for varying combinations of conditions and fields.

Figure 4:
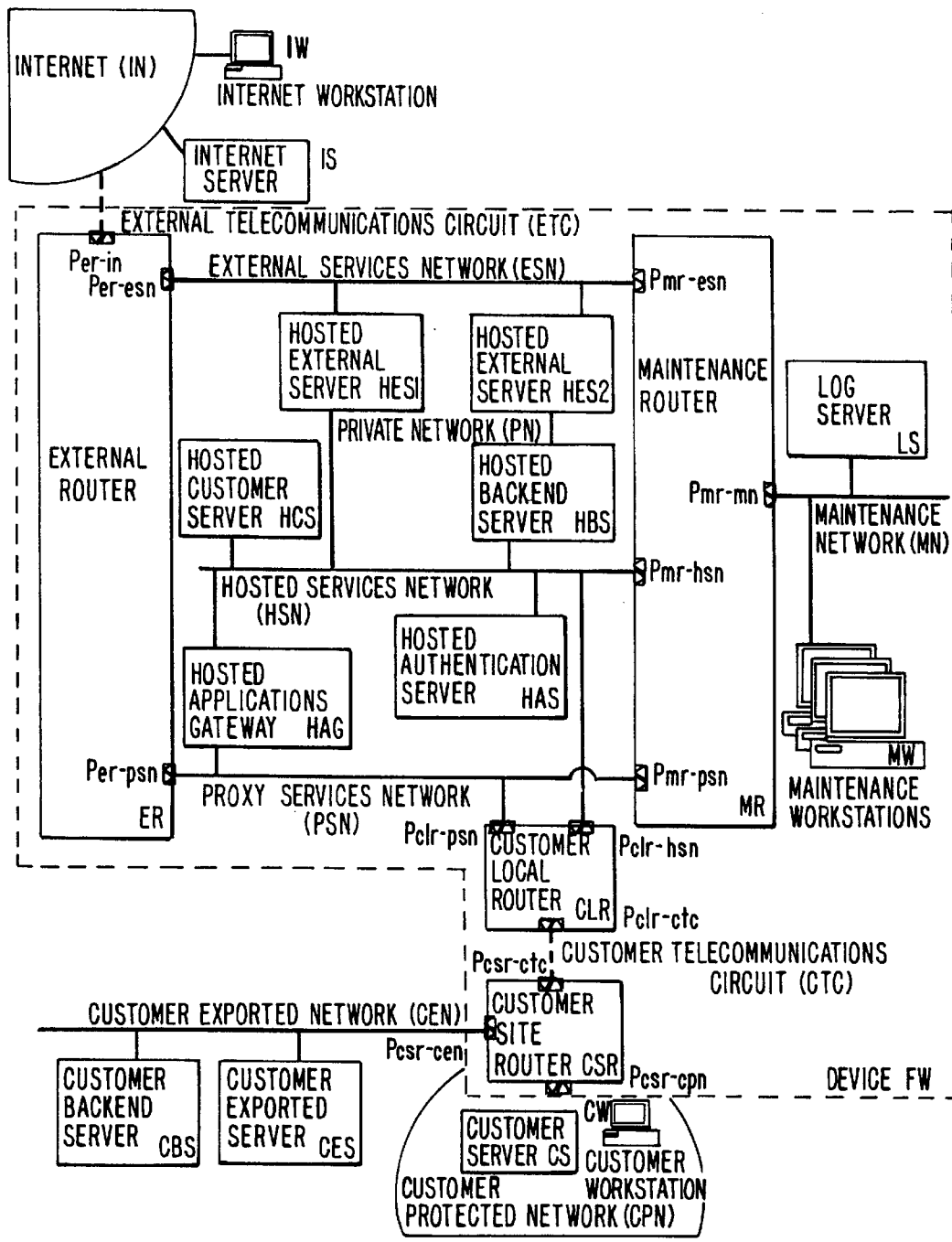
FIG. 4 shows the points within Device FW with representative points at which a packet filtering policy can be established.

FIG. 4 shows the points within Device FW at which a Packet-Filtering Policy can be established, labelled there as:

Per-in

Per-esn

Per-psn

Pmr-esn

Pmr-mn

Pmr-psn

Pmr-hsn

Pclr-psn

Pclr-hsn

Pclr-ctc

Pcsr-ctc

Pcsr-psn

Pcsr-cpn

Each of these packet filtering policy application points is located at the interface between a router and a network interface or at the interface between a router and a telecommunications link interface. Each packet filtering policy application point can be configured to permit or deny packet flow between the router and the interface. Policy can be applied to packet flow between the interface and the router or between the router and the interface. These policies may be asymmetric, allowing packet flow in one direction but blocking it in the converse direction, or they may be symmetric, allowing or blocking packet flow in both directions.

Figure 5:
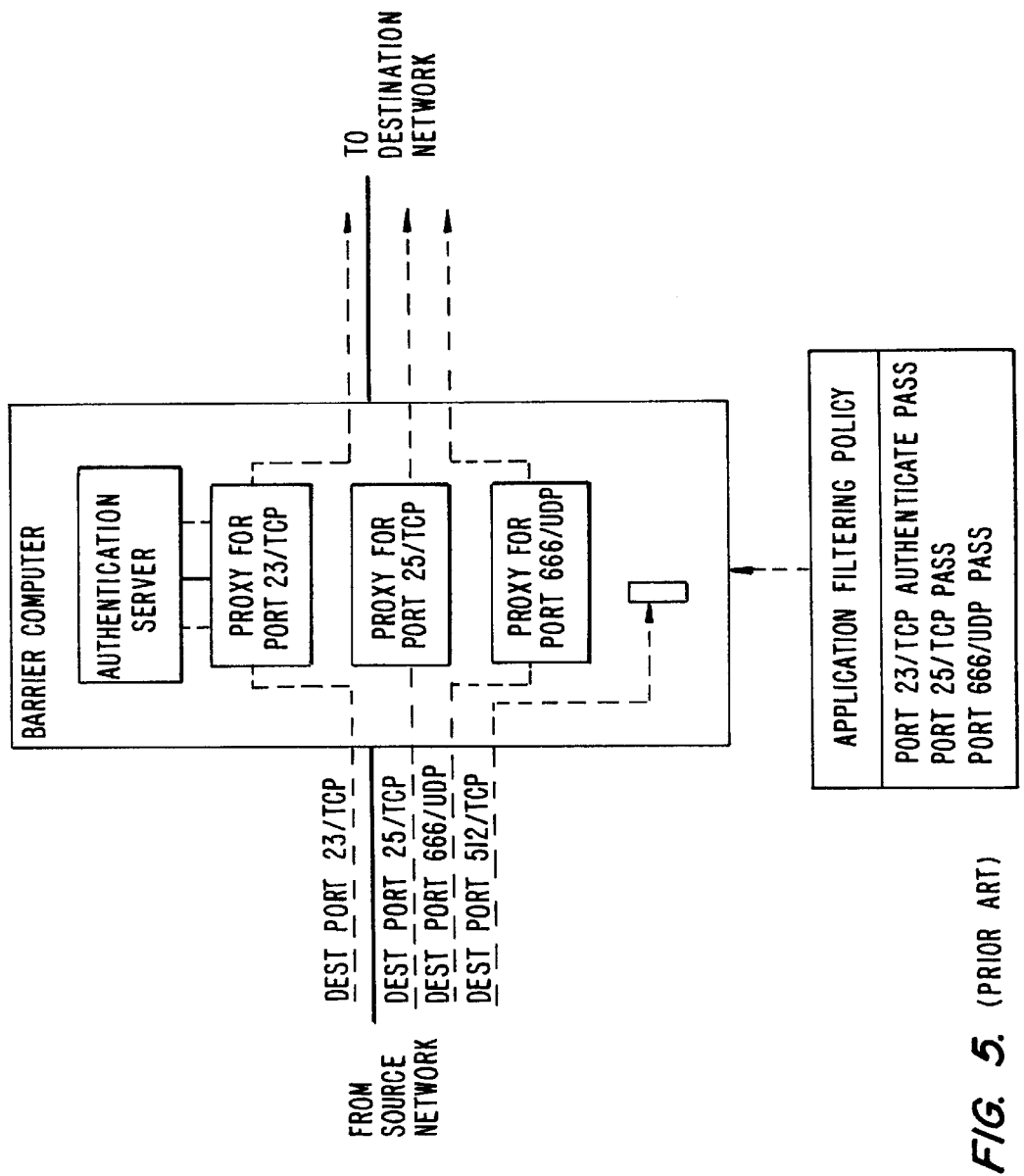
FIG. 5 shows an example of an applications level filter.

FIG. 5 shows an example of an applications level filter. Examples of applications would include remote terminal service, E-mail, file transfer, games. An application filter is a program running on a computer that is interposed in the network between the source and destination networks. This computer acts as a barrier that enforces a security policy between the two networks. A person wishing to use a service on the other side of the barrier must instead connect to the barrier computer. This computer may be configured to run software known as a proxy server. A proxy acts as a surrogate for the service on the far side. A proxy server must be running on the barrier computer for each service that is to be passed through the barrier. The barrier computer must be configured to pass no other services than those specifically allowed by the proxy servers running.

A barrier computer is configured with an Application Filtering Policy which determines the services which will pass and the manner in which they are passed. Services may be passed directly through the proxy or additional constraints may be placed upon them before passage is permitted. A typical constraint is that of authentication. A security policy may be defined that requires that only specific people may be permitted to access services through a barrier computer. In order to determine that an authorized person is connect to the proxy server, the proxy server may require some means of authentication, such as a user name and password. Once the proper credentials are supplied, the connection passes through the proxy server and the barrier, to the service on the other side. Unlike a packet filtering policy, an applications filtering policy is always restrictive, which means that unless a service has an explicitly configured proxy server running on the barrier computer, it will not be passed through.

FIG. 5 shows a typical barrier computer configuration, with an authentication server and three proxy servers running. An applications filtering policy has been configured into the barrier computer, allowing connections to pass on port 23 (typically the remote terminal session port), port 25 (electronic mail) and port 666 (a game). A connection request for port 23/tcp service arrives at the barrier computer and is passed to the port 23/tcp proxy. This proxy has a policy of authentication before passage, so the user's credentials are referred to the authentication server, which approves them. The proxy then passes the connection through to the destination machine. A connection request for port 25/tcp service arrives at the barrier computer and is passed to the port 25/tcp proxy. This proxy is configured to pass the traffic along, and does so with no further authentication. A packet for port 666/UDP service arrives at the barrier computer and is passed to the port 666/udp proxy. This proxy server is configured to pass the packet along and does so with no further authentication. A connection request for port 512/tcp service, the remote command execution service arrives at the proxy. The application filtering policy does not explicitly cover this service, and so no proxy is configured for this. The request for service is denied.

Figure 6:
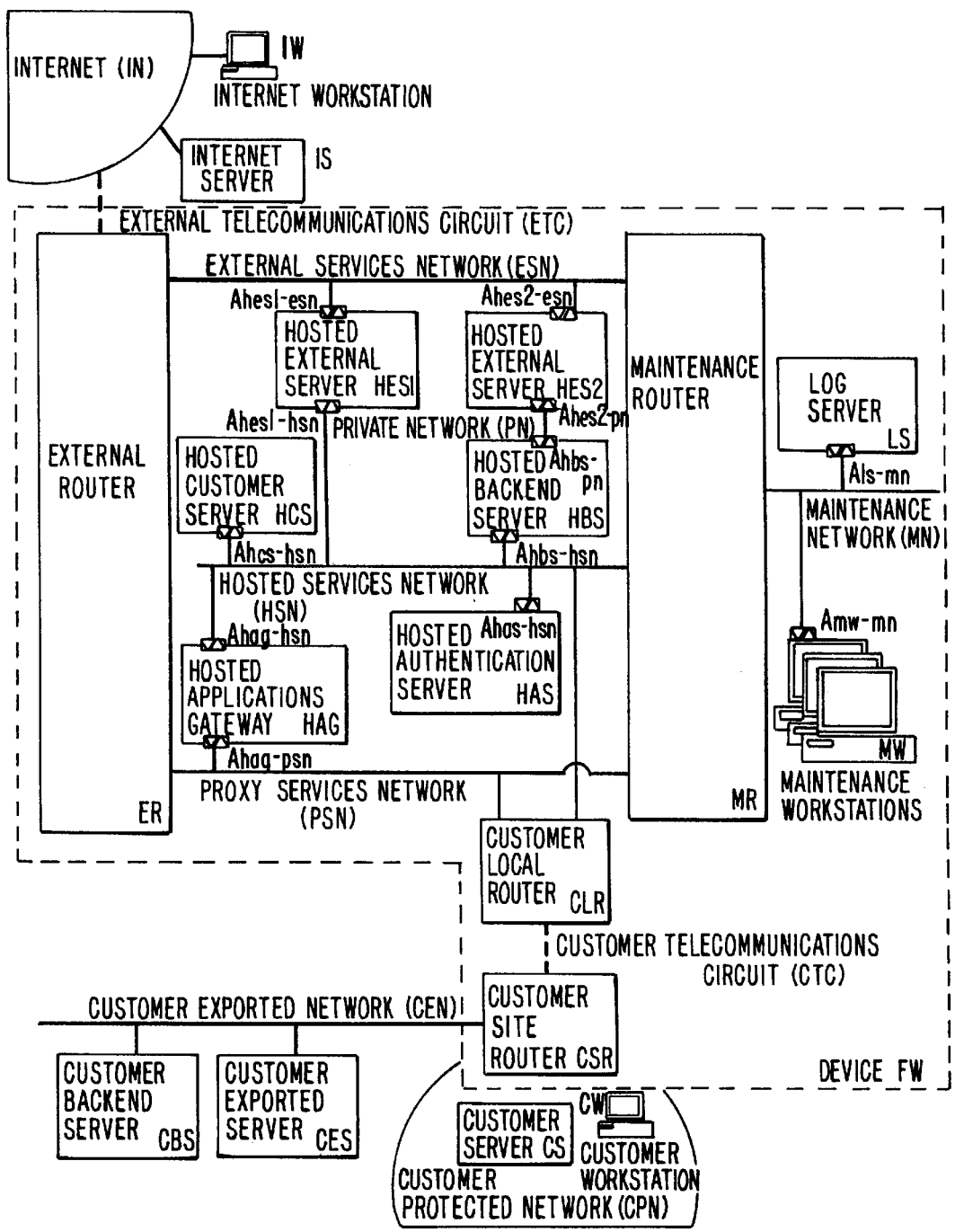
FIG. 6 shows the points within Device FW with representative points at which an application filtering policy can be established.

FIG. 6 shows several points at which an Application Filtering Policy can be established, which are labelled:

Ahes1-esn

Ahes2-esn

Ahcs-hsn

Ahes1-hsn

Ahbs-hsn

Ahes2-pn

Ahbs-pn

Ahag-hsn

Ahas-hsn

Ahag-psn

Als-mn

Amw-mn

Each application filtering policy application point is located at the interface between a computer and a network. Applications filtering policy can be defined based on many different types of criterion, which could include:

Source address

Destination address

Source port

Destination port

Protocol (tcp, UDP, ICMP)

Time of day

User authentication

Server workload

The more constraining criterion an application filtering policy can apply, the more secure it will be. However, a policy configuration for a given customer requires a balance between usability and security if it is to be practical.

Figure 7:
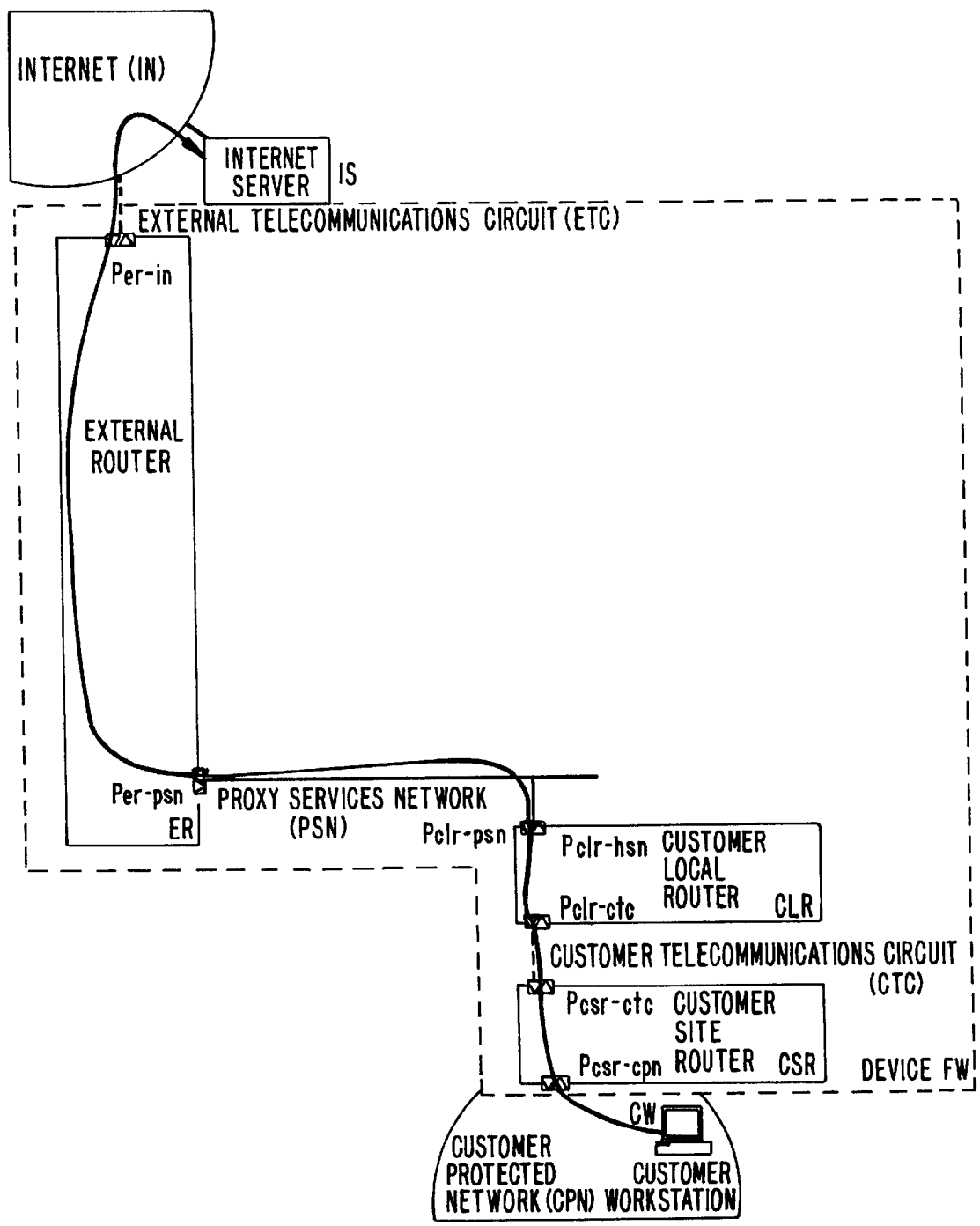
FIG. 7 is a simplified block diagram of Device FW showing a path for traffic between a workstation located on a Customer Protected Network (CPN) and a server on the Internet via a directly-routed, packet-filtered path.

FIG. 7 shows the path that traffic would take between a workstation located on the Customer Protected Network (CPN) and needing to access a server on the Internet via a directly-routed, packet-filtered path. In order to achieve this, packet-filtering policy must be set at the following points:

Pcsr-cpn

Pcsr-ctc

Pclr-ctc

Pclr-psn

Per-psn

Per-in

Figure 8:
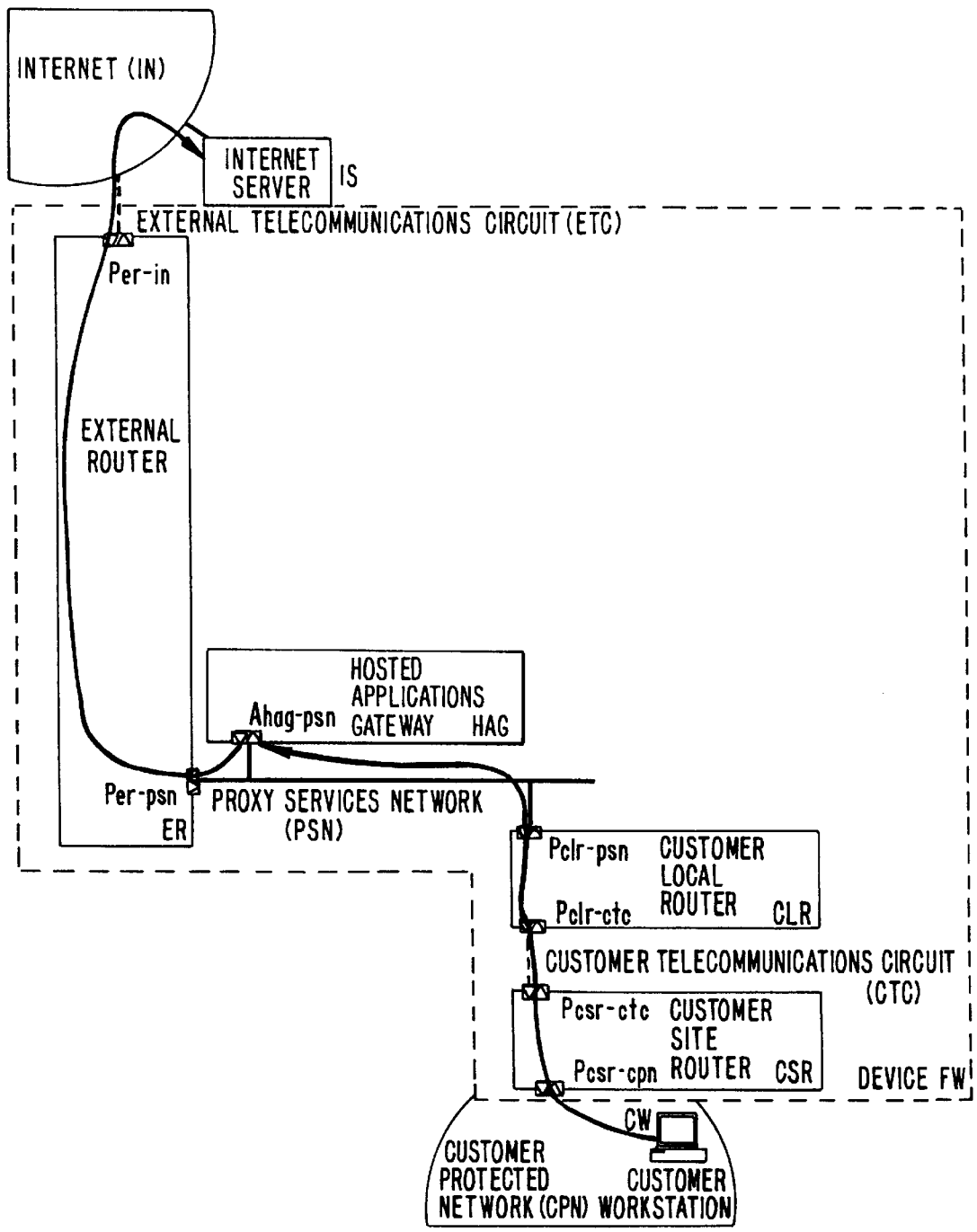
FIG. 8 is a simplified block diagram of Device FW showing a path for traffic between a workstation on the CPN and an Internet server via an application-filtered connection.

FIG. 8 shows the path that traffic would take for a connection from a workstation on the CPN to access an Internet server by means of an application-filtered connection. In order to achieve this, packet-filtering policy must be set at the following points:

Pcsr-cpn

Pcsr-ctc

Pclr-ctc

Pclr-psn

Per-psn

Per-in

Additionally, application filtering policy must be set at the point labelled "Ahag-psn". The packet filtering policy in this case would be different than that shown in FIG. 7. In particular, the policy set at Pclr-psn would be set to permit traffic only to the HAG machine, and the policy at Per-psn would be set to accept traffic only from the HAG machine.

Figure 9:
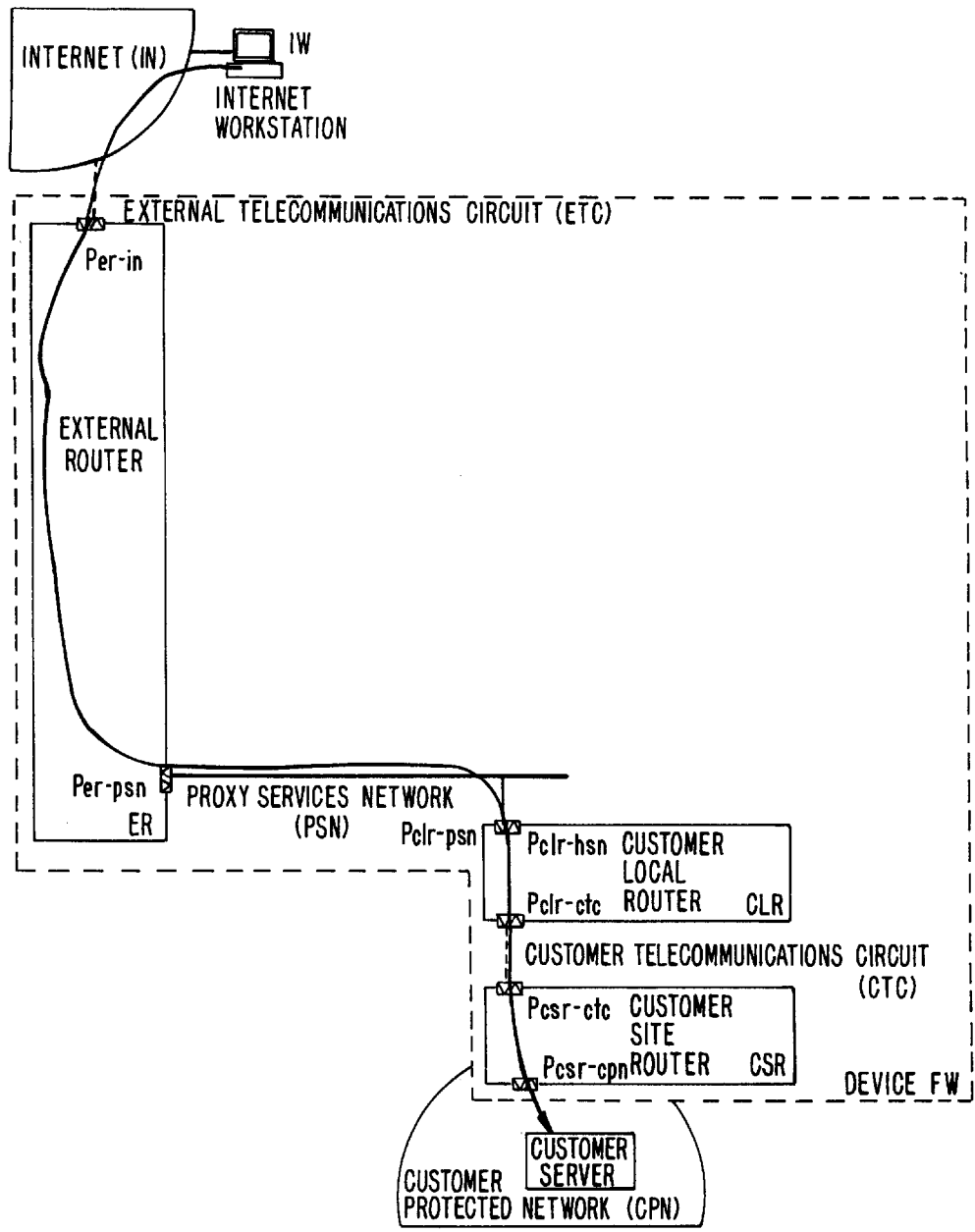
FIG. 9 is a simplified block diagram of Device FW showing a path for traffic between a workstation on the Internet and a server on the CPN via a directly-routed, packet-filtered connection.

FIG. 9 shows the path that traffic would take for a connection from a workstation on the Internet to access information on a server on the CPN by means of a directly-routed, packet-filtered connection. In order to achieve this, packet-filtering policy must be set at the following points:

Per-in

Per-psn

Pclr-psn

Pclr-ctc

Pcsr-ctc

Pcsr-cpn

Figure 10:
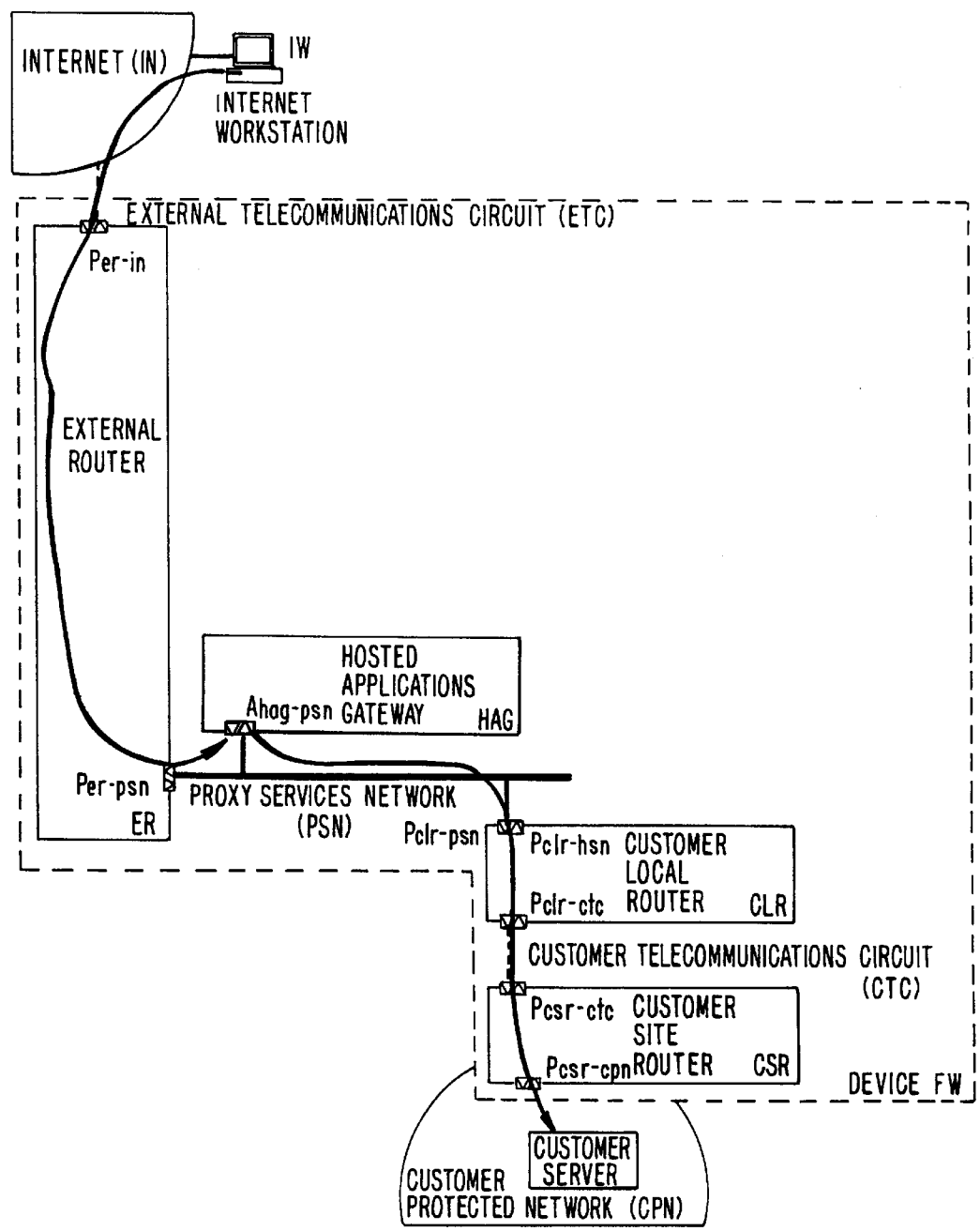
FIG. 10 is a simplified block diagram of Device FW showing a path for traffic between a workstation on the Internet and a server on the CPN via an application-filtered connection.

FIG. 10 shows the path that traffic would take for a connection from a workstation on the Internet to access information on a server on the CPN by means of an application-filtered connection. In order to achieve this, packet-filtering policy must be set at the following points:

Per-in

Per-psn

Pclr-psn

Pclr-ctc

Pcsr-ctc

Pcsr-cpn

Additionally, application-filtering policy must be set at the point labelled "Ahag-psn". The packet filtering policy in this case would be different than that shown in FIG. 9. In particular, the policy set at Pclr-psn would be set to permit traffic only to the HAG machine, and the policy at Per-psn would be set to accept traffic only from the HAG machine.

Figure 11:
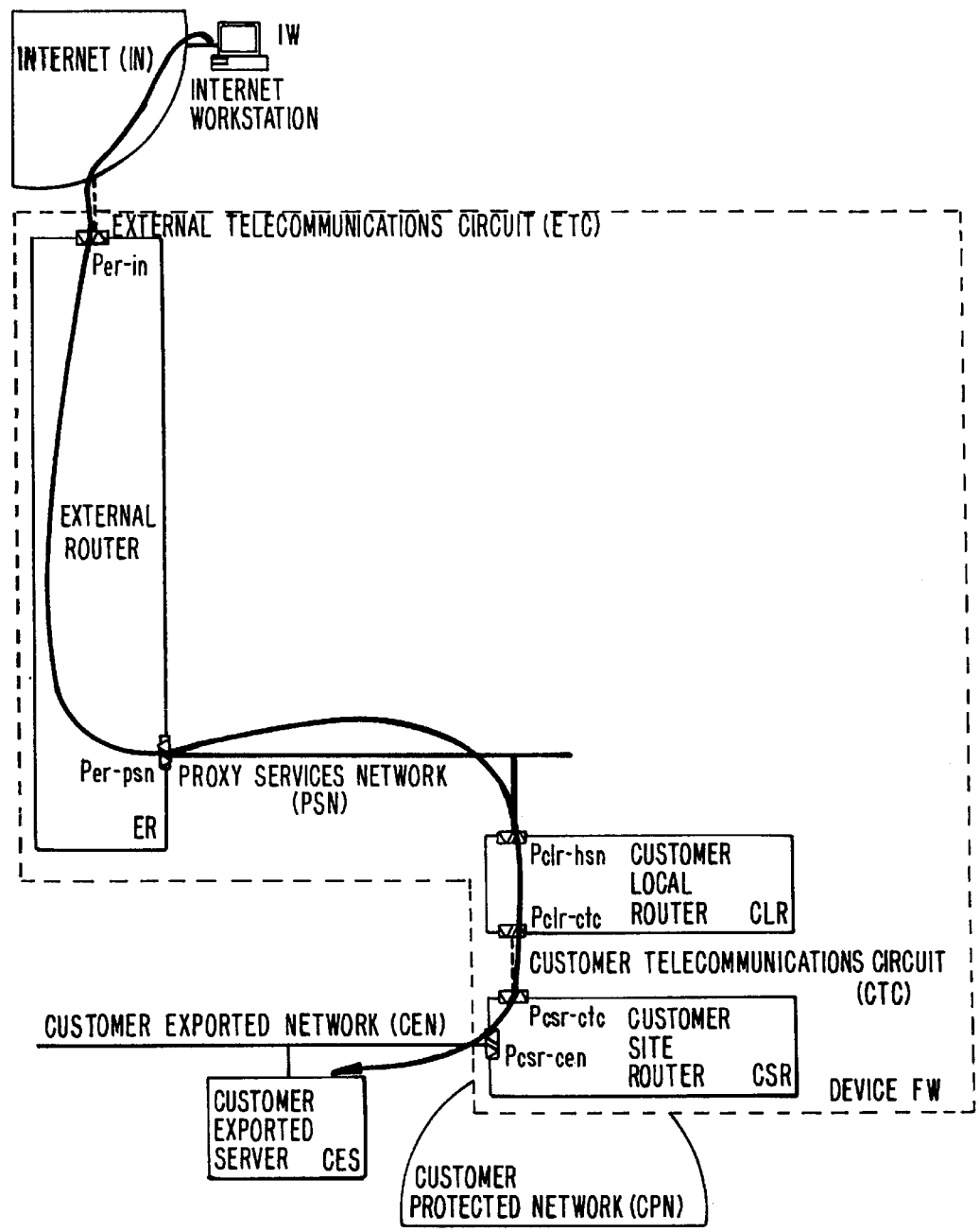
FIG. 11 is a simplified block diagram of Device FW showing a path for traffic between a workstation on the Internet and a server on a Customer Exported Network (CEN) via a directly routed, packet-filtered connection.

FIG. 11 shows the path that traffic would take for a connection from a workstation on the Internet to access information on a server on the Customer Exported Network (CEN) by means of a directly routed, packet-filtered connection. This is a more typical configuration than the one shown in FIG. 10, because a CEN is specifically set up to support this type of access, while restricting the path from the Internet to the CPN. This configuration also provides much more security for the CES, the CEN, and the CPN. In order to achieve this, packet-filtering policy must be set at the following points:

Per-in

Per-psn

Pclr-psn

Pclr-ctc

Pcsr-ctc

Pcsr-psn

Figure 12:
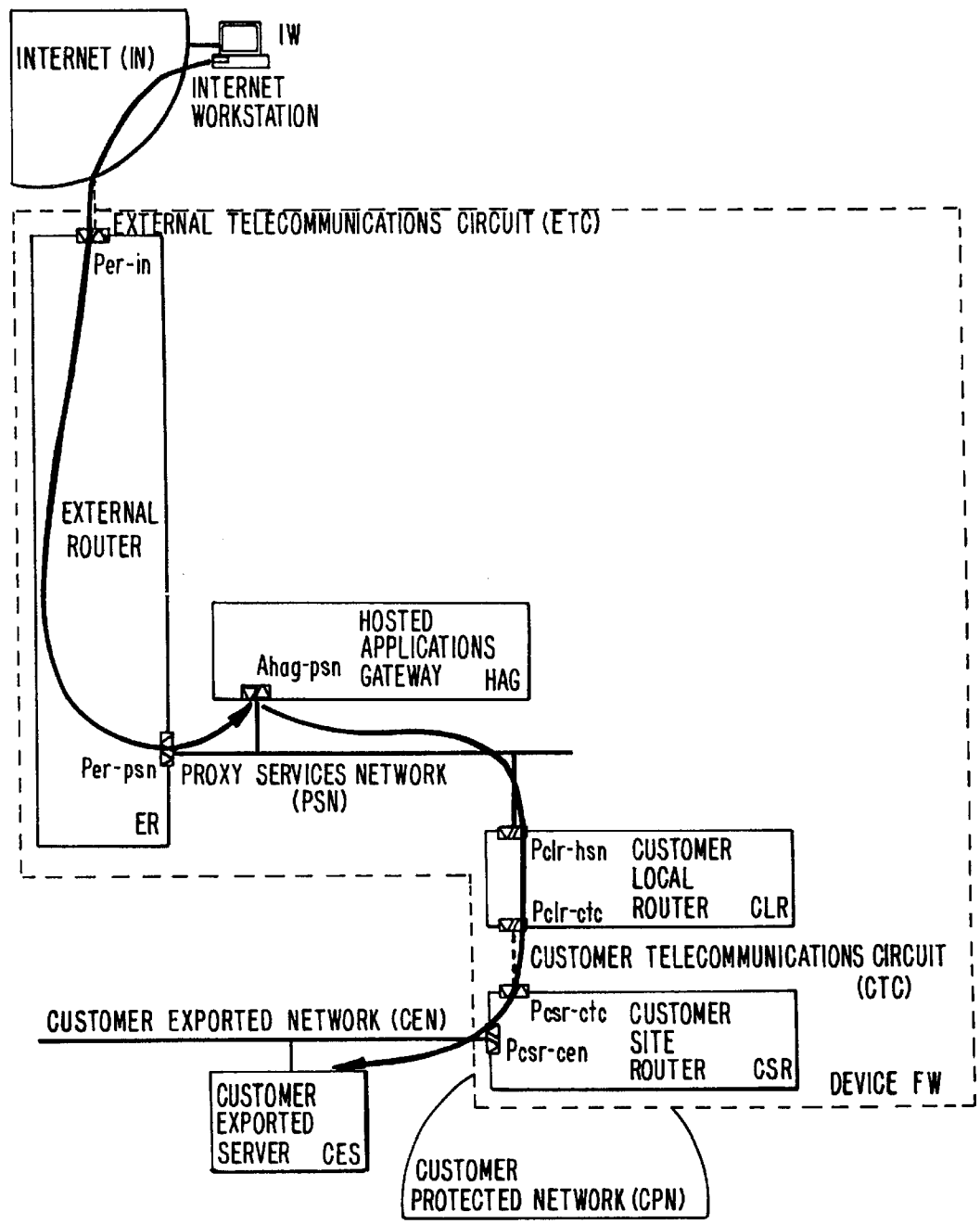
FIG. 12 is a simplified block diagram of Device FW showing a path for traffic between a workstation on the Internet and a server on the CEN via an application-filtered connection.

FIG. 12 shows the path that traffic would take for a connection from a workstation on the Internet to access information on a server on the Customer Exported Network (CEN) by means of an application-filtered connection. In order to achieve this, packet-filtering policy must be set at the following points:

Per-in

Per-psn

Pclr-psn

Pclr-ctc

Pcsr-ctc

Pcsr-cen

Additionally, application-filtering policy must be set at the points labelled "Ahag-hsn" and "Ahag-psn". The packet filtering policy in this case would be different than that shown in FIG. 11. In particular, the policy set at Pclr-psn would be set to permit traffic only to the HAG machine, and the policy at Per-psn would be set to accept traffic only from the HAG machine.

Figure 13:
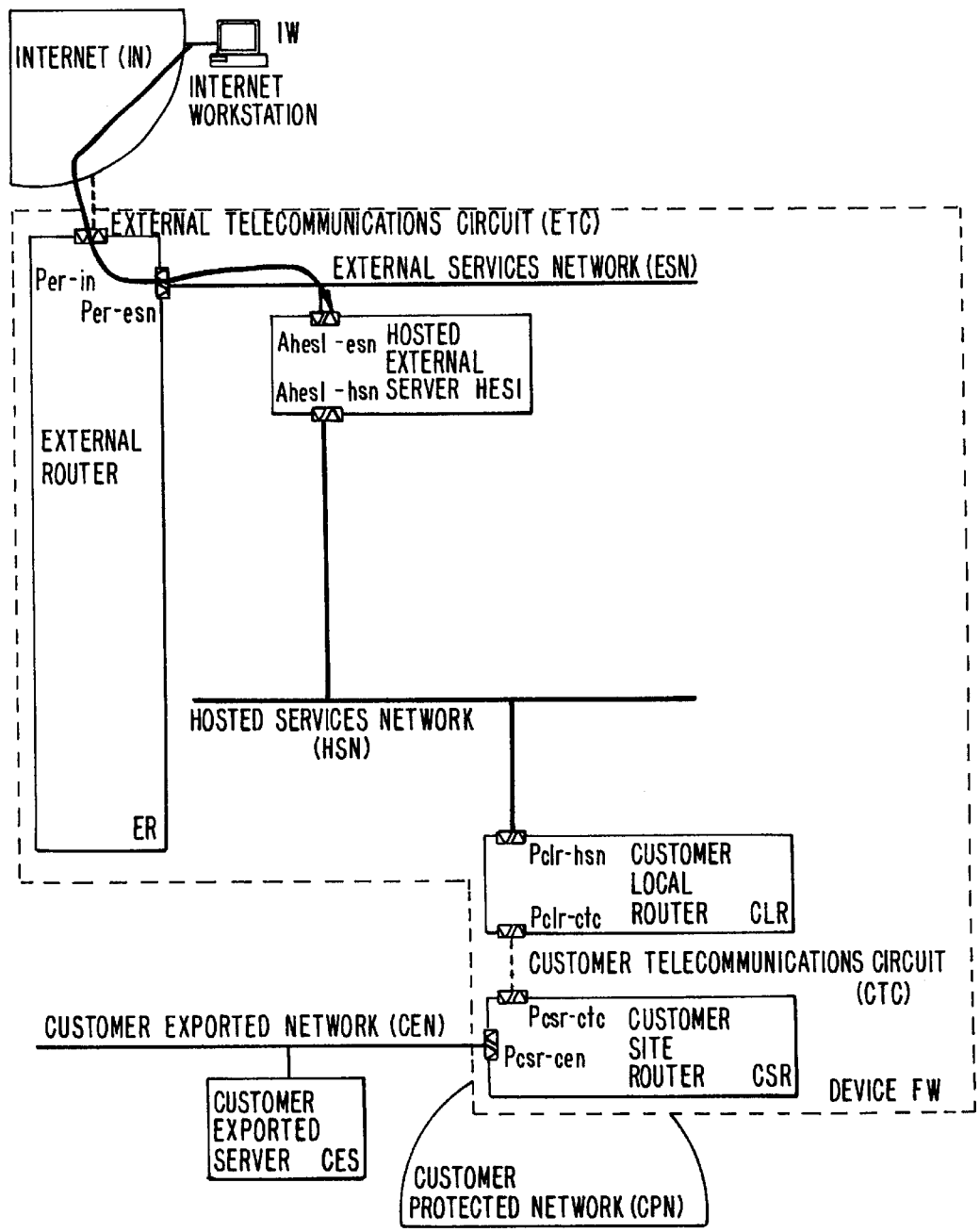
FIG. 13 is a simplified block diagram of Device FW showing a path for traffic between an Internet workstation and a server hosted within Device FW.

FIG. 13 shows the path that traffic from an Internet workstation would take to access a server that was hosted within Device FW. This type of hosting would provide much more security than the configurations shown in FIGS. 9, 10, 11 and 12, as well as better performance. In order to achieve this, packet-filtering policy is set at the points labelled "Per-in" and "Per-psn" while application-filtering policy is at the points labelled "Ahes1-esn" and "Ahes1-hsn".

Figure 14:
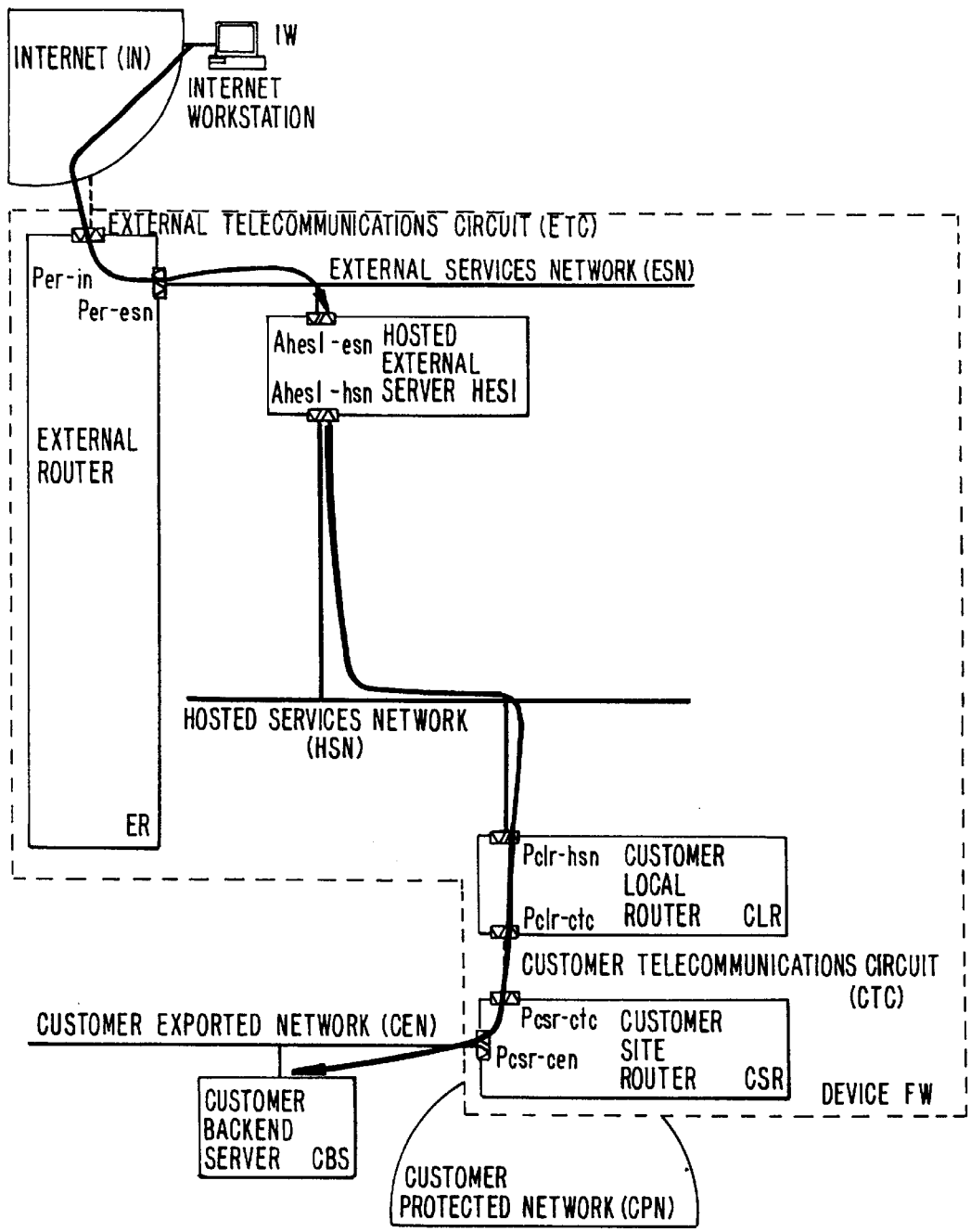
FIG. 14 is a simplified block diagram of Device FW showing another path for traffic between an Internet workstation and a server hosted within Device FW.

FIG. 14 shows the path that traffic from an Internet workstation would take to access a server that was hosted within Device FW. This type of hosting would provide much more security than the configurations shown in FIGS. 9, 10, 11 and 12, as well as better performance. This case differs from that shown in FIG. 13 in that the Hosted External Server (HES1) requires a connection to a "back-end" server such as a database server. This type of configuration is very common for large World-Wide-Web servers. The server in this case is connected to the Customer Exported Network. In order to achieve this, packet-filtering policy must be set at the following points:

Per-in

Per-psn

Pclr-hsn

Pclr-ctc

Pcsr-ctc

Pcsr-cen

Additionally, application-filtering policy must be set at the points labelled "Ahes1-esn" and "Ahes1-hsn".

Figure 15:
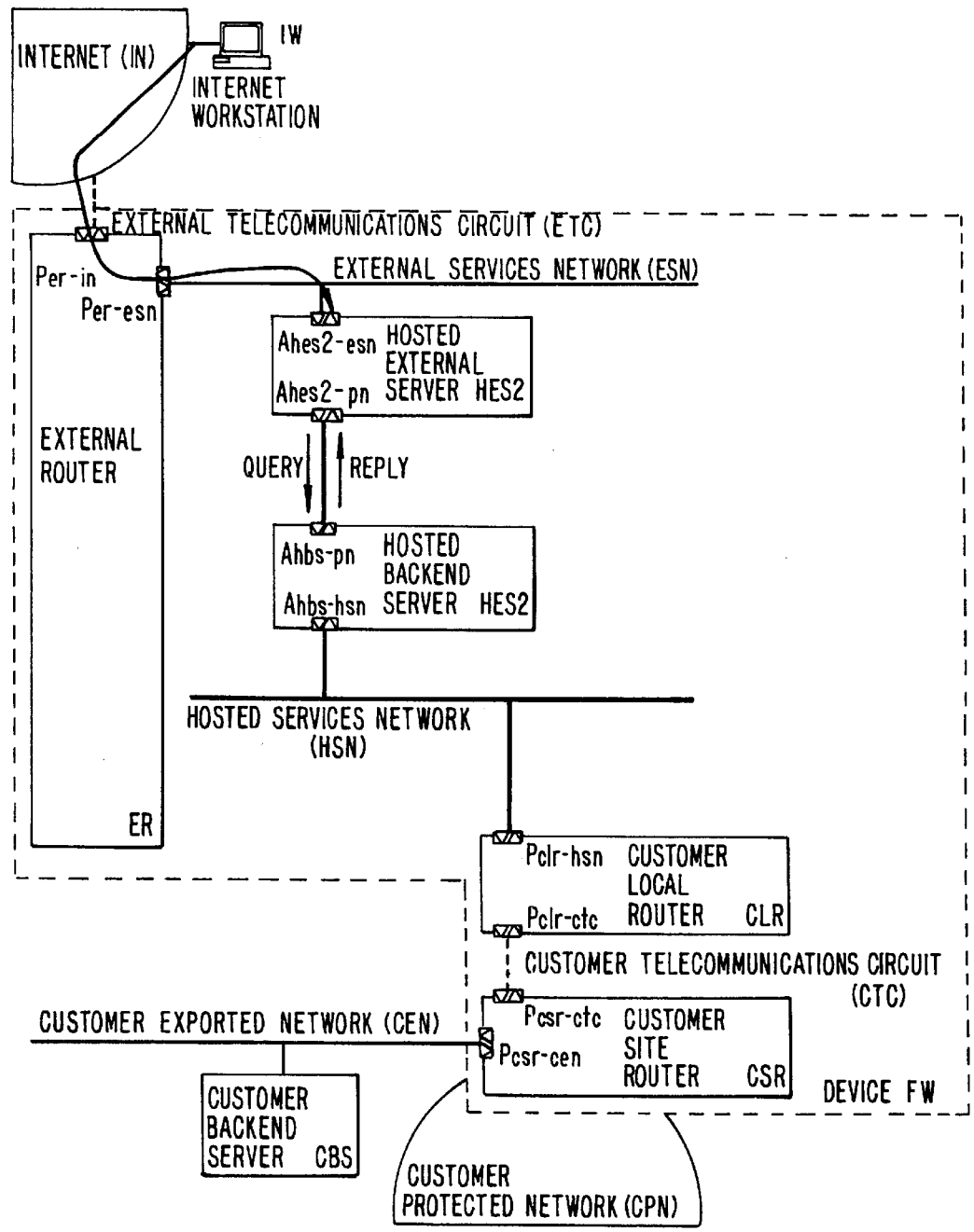
FIG. 15 is a simplified block diagram of Device FW showing a yet another path for traffic between an Internet workstation and a server hosted within Device FW.

FIG. 15 shows the path that traffic from an Internet workstation would take to access a server that was hosted within Device FW. This case differs from that shown in FIG. 13 in that the Hosted External Server (HES1) requires a connection to a "back-end" server such as a database server. This type of configuration is very common for large WorldWide-Web servers. In this case, the server is also hosted within Device FW. In order to achieve this, packet-filtering policy is set at the points labelled "Per-in" and "Per-psn" and application-filtering policy is set at the points labelled "Ahes2-esn", "Ahes2-pn", "Ahbs-pn" and "Ahbs-hsn".

Figure 16:
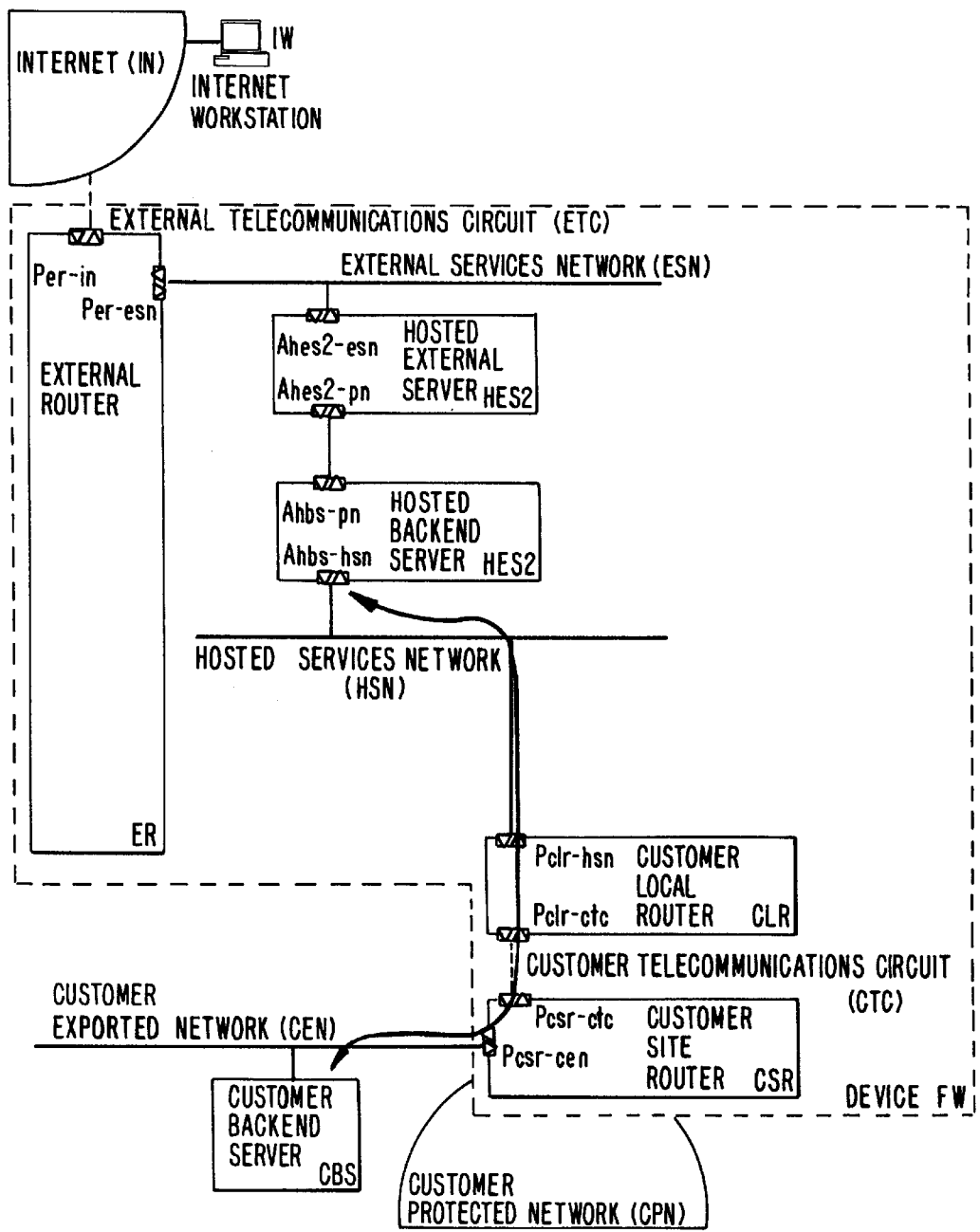
FIG. 16 is a simplified block diagram of Device FW showing a path a replication connection would use to copy data from a Customer Backend Server (CBS) to a Hosted Backend Server (HBS).

FIG. 16 shows the path that a replication connection would use to copy data from a Customer Backend Server (CBS) to a Hosted Backend Server (HBS). By doing this, in conjunction with the configuration shown in FIG. 15, provides a much more secure and robust mechanism for building a high-performance, high-capacity External Server. In order to achieve this, packet-filtering policy is set at the points labelled "Per-in" and "Per-psn" and applications filtering policy is set at the points labelled "Ahbs-pn" and "Ahbs-hsn".

Figure 17:
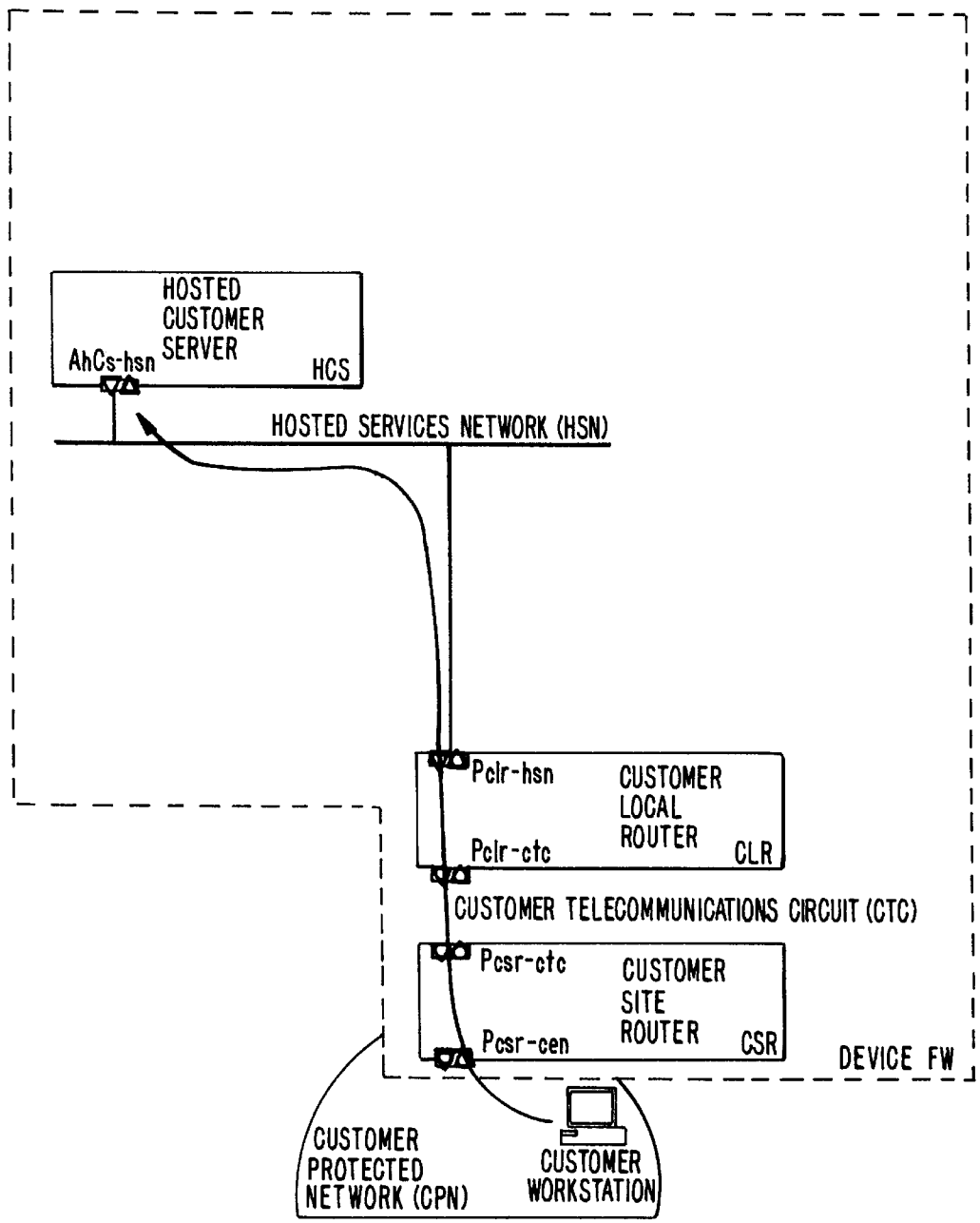
FIG. 17 is a simplified block diagram of Device FW showing a path for traffic from a workstation on the CPN for directly-routed, packet-filtered access to a Hosted Customer Server.

FIG. 17 shows the path of traffic from a workstation on the CPN for directly-routed, packet-filtered access to a Hosted Customer Server. This approach would be taken for servers that would normally reside on the CPN, but for various reasons such as security or difficulty of administration, have been outsourced and now reside within Device FW. In order to accomplish this, packet-filtering policy must be set at the following points:

Pcsr-cpn

Pcsr-ctc

Pclr-ctc

Pclr-hsn

Additionally, applications filtering policy must be set at the point labelled "Ahcs-hsn".

It should be readily apparent to those skilled in the art that, after reading this description, a wide range of modifications may be made to the security policy of a particular embodiment of this apparatus. The scope of the invention should, therefore, be determined not with reference to the above description, but instead should be determined with reference to the appended claims along with their full scope of equivalents.

What is claimed is:

1. A security handler for packet transfer between an insecure network and a secure network wherein packets are passed or blocked between the insecure network and the secure network to secure the secure network against attacks from the insecure network, the security handler comprising:

means for obtaining customer security policies, wherein a customer security policy is a set of one or more rule defining a set of capabilities that are allowed or disallowed for a given customer's secure network, modifiable in response to security attacks encountered, and wherein customer security policies can be distinct for distinct customers;

a plurality of packet processing components;

a plurality of communication paths between components of the plurality of packet processing components; and configurable policy enforcement means, at each connection of a communication path and a packet processing component, for enforcing a packet policy for packets transported between the communication path and the packet processing component, wherein the packet policy is a function of the customer security policies.

2. A method of securing a plurality of secure customer networks while connected to one or more insecure networks, wherein packet traffic on an insecure network can be generated and observed without authorization, comprising the steps of:

interposing a packet processor between at least one of the secure networks and at least one of the insecure networks, wherein the packet processor includes a plurality of paths over which packets are transported between the at least one insecure network and the at least one secure network;

identifying control points within the packet processor, wherein a control point is a node through which packet traffic having predetermined characteristics flows and each control point has a set of one or more predetermined characteristics associated therewith;

storing customer security policies for each of the plurality of secure customer networks, wherein a customer security policy specifies capabilities that are allowed or not allowed with respect to an associated secure customer network, wherein a capability is provided by packet traffic having predetermined characteristics associated with that capability and wherein customer security policies can be distinct for distinct customers;

controlling packet traffic flow between control points in accordance with the customer security policies to limit the capabilities of-each secured customer network to those capabilities allowed by the customer security policies; and modifying customer sercurity policies in response to security attacks encountered.

3. The method of claim 2, wherein the capabilities controlled in the step of controlling packet traffic flow include e-mail transport, hypertext transport protocol packet transport, file transport and remote terminal access.

4. The method of claim 2, wherein the predetermined characteristics include a packet source address and port, a packet destination address and port, a protocol, a time of day, and an authorization status.

5. A method of controlling a data exchange between a customer network and an external network comprising the steps of:

for each data object, a data object comprising one or more packets, identifying object features including a packet source address and port, a packet destination address and port and an object protocol;

applying policy rules from a policy table to features of the data object, where a policy rule is a variable rule, determined by a customer policy, for excluding or including the data object based on the object's features, wherein customer policies can be distinct for distinct customers and customer policies are modifiable in response to security attacks encountered; and if a policy rule indicates that a data object should be included and no policy rule indicates that the data object would be excluded, forwarding the data object from its source to destination.

6. A common hardware platform for handling multiple customer networks, each of which may have different security policies, the common hardware platform comprising:

a policy database containing a plurality of policies for the multiple customer networks, wherein a policy is a rule about what capabilities are allowed or disallowed for traffic between a customer network and another network when the conditions of the rule are met and wherein policies can be distinct for distinct customers and policies are modifiable in response to security attacks encountered; and means for controlling data traffic between a customer network and another network based on the policies in the policy database.

7. The common hardware platform of claim 6, wherein the means for controlling data traffic selects an action from permitting the data traffic to flow, denying the data traffic and redirecting the data traffic.

* * * * *